(12) United States Patent
Schäferling et al.

(10) Patent No.: US 11,097,364 B2
(45) Date of Patent: Aug. 24, 2021

(54) METHOD FOR HARD FINISHING TOOTHED GEARING, PARTICULARLY INTERNALLY TOOTHED PORTIONS AND MACHINE TOOL SUITABLE THEREFOR

(71) Applicant: GLEASON-PFAUTER MASCHINENFABRIK GMBH, Ludwigsburg (DE)

(72) Inventors: Karl Schäferling, Unterschleissheim (DE); Johannes Brogni, Dotzigen (CH)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 0 days.

(21) Appl. No.: 16/474,749

(22) PCT Filed: Nov. 17, 2017

(86) PCT No.: PCT/EP2017/001358
§ 371 (c)(1),
(2) Date: Jun. 28, 2019

(87) PCT Pub. No.: WO2018/130260
PCT Pub. Date: Jul. 19, 2018

(65) Prior Publication Data
US 2019/0321901 A1  Oct. 24, 2019

(30) Foreign Application Priority Data
Jan. 12, 2017 (DE) .......................... 102017000260.6

(51) Int. Cl.
*B23F 5/02* (2006.01)
*B23F 5/16* (2006.01)
*B24B 19/00* (2006.01)

(52) U.S. Cl.
CPC ................ *B23F 5/163* (2013.01); *B23F 5/02* (2013.01); *B24B 19/009* (2013.01)

(58) Field of Classification Search
CPC .......... B23F 19/00; B23F 19/02; B23F 19/04; B23F 19/10; B23F 19/101; B23F 5/02; B23F 5/163; B23F 5/20
See application file for complete search history.

(56) References Cited

U.S. PATENT DOCUMENTS

| 4,615,150 A | * | 10/1986 | Panetti | E01B 31/12 |
| | | | | 451/347 |
| 6,390,894 B1 | * | 5/2002 | Beel | B23F 5/02 |
| | | | | 409/27 |

(Continued)

FOREIGN PATENT DOCUMENTS

| DE | 975164 C | 9/1961 |
| EP | 2745970 A1 | 6/2014 |

(Continued)

OTHER PUBLICATIONS

Machine translation of IDS provided reference DE 975164; pp. 8-13 (Year: 2020).*

(Continued)

*Primary Examiner* — Nicole N Ramos
(74) *Attorney, Agent, or Firm* — Robert L. McDowell (57) ABSTRACT

The invention relates to a method and a machine tool for hard finishing toothed gearing, particularly internally toothed portions (3), in which method a toothed hard finishing tool (W) which rotates about its axis of rotation is brought into rolling machining engagement with the machined toothed gearing in one pass or in a plurality of passes of differing radial infeed depth under an advance motion with a direction component parallel to the axis of rotation (C) of the machined toothed gearing and under a non-null axis crossing angle, and material is removed from (Continued)

the machined toothed gearing with a tooth flank region (4a) of the machine tool gearing with tooth thickness increasing in the tooth trace direction from the end face (5) facing the machined toothed gearing.

16 Claims, 6 Drawing Sheets

(56) References Cited

U.S. PATENT DOCUMENTS

| | | | | |
|---|---|---|---|---|
| 8,147,296 | B2* | 4/2012 | Lopez | B24B 53/085 |
| | | | | 451/56 |
| 2012/0099939 | A1* | 4/2012 | Stadtfeld | B23F 15/06 |
| | | | | 409/38 |
| 2012/0148360 | A1 | 6/2012 | Heinemann et al. | |
| 2012/0208436 | A1* | 8/2012 | Muller | B23F 19/00 |
| | | | | 451/5 |
| 2012/0309271 | A1* | 12/2012 | Geiser | B23F 23/1225 |
| | | | | 451/47 |
| 2014/0105698 | A1* | 4/2014 | Vogel | B23F 21/043 |
| | | | | 409/36 |
| 2015/0375320 | A1* | 12/2015 | Brogni | B23F 5/163 |
| | | | | 29/893.35 |
| 2016/0089735 | A1* | 3/2016 | Stadtfeld | B23F 9/105 |
| | | | | 451/47 |
| 2016/0121414 | A1 | 5/2016 | Ochi et al. | |
| 2016/0158861 | A1* | 6/2016 | Kleinbach | B23F 5/20 |
| | | | | 409/8 |
| 2017/0120358 | A1* | 5/2017 | Landi | B23F 5/04 |
| 2017/0326662 | A1* | 11/2017 | Philippin | B23F 19/10 |
| 2018/0126471 | A1* | 5/2018 | Strunk | B23F 19/005 |

FOREIGN PATENT DOCUMENTS

| | | |
|---|---|---|
| EP | 3034220 A1 | 6/2016 |
| EP | 3075481 A1 | 10/2016 |
| WO | 2014/192672 A1 | 12/2014 |

OTHER PUBLICATIONS

Jorg Schieke, "Aussermittiges Bearbeiten ohne Abweichungen", Werkstatt + Betrieb, Carl Hanser Verlag, Munchen DE, vol. 147, No. 6, Jun. 1, 2014, pp. 46-48.
International Search Report and Written Opinion for PCT/EP2017/001358, ISA/EPO, dated Feb. 16, 2018, 14 pgs.

* cited by examiner

METHOD FOR HARD FINISHING TOOTHED GEARING, PARTICULARLY INTERNALLY TOOTHED PORTIONS AND MACHINE TOOL SUITABLE THEREFOR

The invention relates to a method for hard-finishing teeth, in particular internal teeth, and a gear cutter designed therefor.

It is known that teeth are brought into their predetermined target end geometry by means of hard-finishing after hardening. In this case, an existing allowance is removed by an abrasive machining operation, e.g. by a grinding process. Profile grinding or generating grinding can be referred to as known methods.

In the case of hard-finishing internal teeth, not all machining alternatives are available, as topological boundary conditions are predetermined by the internal teeth, which conditions make it impossible to use longer grinding worms, for example. In T. Bausch, "Innovative Zahnradfertigung," 3rd edition, the grinding of internal teeth using a profile grinding machine is shown in Fig. 15.5-11(B) on page 579. The problem of space explained above can be clearly seen in this illustration.

In the introductory part of EP 3 034 220 A1, reference is made, inter alia, to DE 10 2010 021 749 A1 as a known method for grinding internal teeth, and to WO 2014/192672 A1. According to the teaching of EP 3 034 220 A1, a removal is ground by continuous relative movement of the teeth of a grinding tool into the gaps of the teeth of the tool, the speed of the relative movement being greater than during hob peeling and/or greater than 300 m/min, in particular greater than 400 m/min, very particularly greater than 500 m/min. In this case, skewed axes are used, and grinding tools can be designed as a spur gear, it being possible for the tooth tip diameter and the tooth root diameter to decrease over the tooth width in order to provide clearance angles, which could alternatively be achieved, however, by adjusting the axes of rotation relative to one another.

The problem addressed by the invention is that of improving a hard-finishing method of the type mentioned at the outset, in particular with respect to a longer service life of the hard-finishing tool.

This problem is solved in procedural terms by a method for hard-finishing teeth, in particular internal teeth, which method is substantially characterized in that a toothed hard-finishing tool which rotates about its axis of rotation is brought into rolling machining engagement with the machined toothed gearing in one pass or in a plurality of passes of different radial infeed depth by a feed movement using a directional component that is in parallel with the axis of rotation of the machined teeth and at an axis intersection angle that differs from zero, and material is removed from the machined teeth using a tooth flank region of the tool teeth having a tooth thickness that increases in the tooth trace direction from the end face nearer the machined teeth.

The method according to the invention has the effect that a region that is larger as seen in the axial direction of the tool contributes to the removal performance of the hard-finishing process, which leads to more uniform wear of the tool and thus to longer service life thereof.

In a particularly preferred embodiment, the tooth flank region of increasing tooth thickness at least at the start comprises a portion of increasing tooth height. This creates favorable geometric conditions for the machining operation.

In a further preferred embodiment of the method, the infeed depth is changed between two passes to such an extent that a half tooth thickness difference of the removing tooth flank region is exceeded by no more than 10% and is in particular no greater than the half tooth thickness and/or no smaller than 40%, in particular no smaller than 30%, of the tooth thickness difference. This creates favorable operation conditions and can also thereby achieve the removal of the total allowance to be removed altogether without using a large number of passes.

In an embodiment further considered to be advantageous, the ratio of the tooth thickness difference of the length of the removing tooth flank region of increasing tooth thickness in the tooth trace direction is at least $1/200$, preferably at least $1/150$, more preferably at least $1/100$, and in particular at most $1/20$, preferably at most $1/30$, in particular at most $1/40$. This results in a favorable combination of tool service life and the time required for hard-finishing.

In a further preferred embodiment of the method, the length of the removing tooth flank region of increasing tooth thickness in the tooth trace direction is at least 1×m, preferably at least 2×m, more preferably at least 4×m, and in particular at least 6×m, m being the module of the tool teeth. This achieves a good combination of the desired long tool service life with the dynamic rigidity of the tool in the machining operation.

In a particularly preferred embodiment, a tooth flank region of constant or decreasing tooth thickness adjoins the tooth flank region of increasing tooth thickness in the tooth flank direction. As a result, the stability of the tool is increased and smoothing operation is achieved at the level of the allowance achieved in the corresponding machining pass, which allowance represents the final geometry in the final pass.

In a further preferred embodiment, a region of decreasing tooth thickness is formed behind the region of increasing tooth thickness in particular on the remote end face.

In a particularly preferred embodiment of the method, a reduced infeed depth change and/or feed rate is used in the last pass with respect to the penultimate pass. This allows a finishing last pass without replacing the grinding tool with a specially designed finishing tool.

The method has proven to be particularly suitable for modules m, measured in [mm], of the tool teeth of at least 0.4, preferably at least 0.7, in particular at least 1 and/or 8, preferably at most 6, in particular at most 4.

With regard to the axis geometry, an axis intersection angle of at least 1°, preferably at least 2°, in particular at least 3°, is particularly preferably provided; however, this angle should be preferably at most 45°, particularly preferably at most 22°, in particular at most 18°. In this way, suitable kinematic conditions for the machining operation are achieved.

In this case, the speed of the workpiece may in particular be at least 40, preferably at least 400, in particular at least 800, rpm, and/or at most 7,000, preferably at most 5,600, in particular 4,800, rpm. This is a good compromise for an acceptable high removal rate with reduced risk of grinding burns.

In this context, it is preferably also provided that the feed rate in mm per workpiece rotation in at least one, in particular multiple passes is at most 0.2, preferably at most 0.15, and/or at least 0.01, preferably at least 0.02, more preferably at least 0.04, and in particular at least 0.06.

The design of the tool surface may be uniform; however, in a preferred embodiment, the abrasive surface is designed, at least in a portion of the abrasive tooth flank region near the end face nearer the machined teeth, as a portion located behind the tooth flank area of increasing tooth thickness, in particular in the form of a coarser grain of an abrasive coating near the end face nearer the machined teeth. The coating on the tool zones of different loads can therefore be adjusted appropriately in machining operation.

The type of shape of the increase with respect to the increase in tooth thickness and/or in tip circle diameter is preferably spherical, in particular with a curvature decreasing over the tooth trace direction from the end face nearer the machined teeth. This can produce favorable work results in terms of a combination of tool service life and quality of hard-finishing.

In terms of the device, the invention proposes a machine tool for hard-finishing teeth, comprising a rotatable clamping means for a tool having teeth provided for machining, in particular internal teeth, a rotationally driven clamping means for a hard-finishing tool having teeth, having movement axes for implementing a radial feed movement between the workpiece and the tool, for the relative movement between the workpiece and the tool which implements the feed movement using a directional component that is in parallel with the axis of rotation of the machined teeth, and an axis of rotation for setting an axis intersection angle, which differs from zero, between the tool axis and the workpiece axis, and a control means which contains control instructions that control the machine in order to carry out a method according to any of the preceding method aspects.

A control program containing such control instructions is also disclosed as being capable of being protected in its own right.

The invention also proposes a hard-finishing tool provided with teeth and rotatable about its axis of rotation, which tool comprises an abrasive tooth flank region having a tooth thickness that increases in the tooth trace region from an end face nearer the teeth to be machined during machining. The hard-finishing tool may also have one or more of the features explained above with reference to the method claims.

Further details, features and advantages of the invention can be found in the following description with reference to the accompanying drawings, in which.

Figure 1:
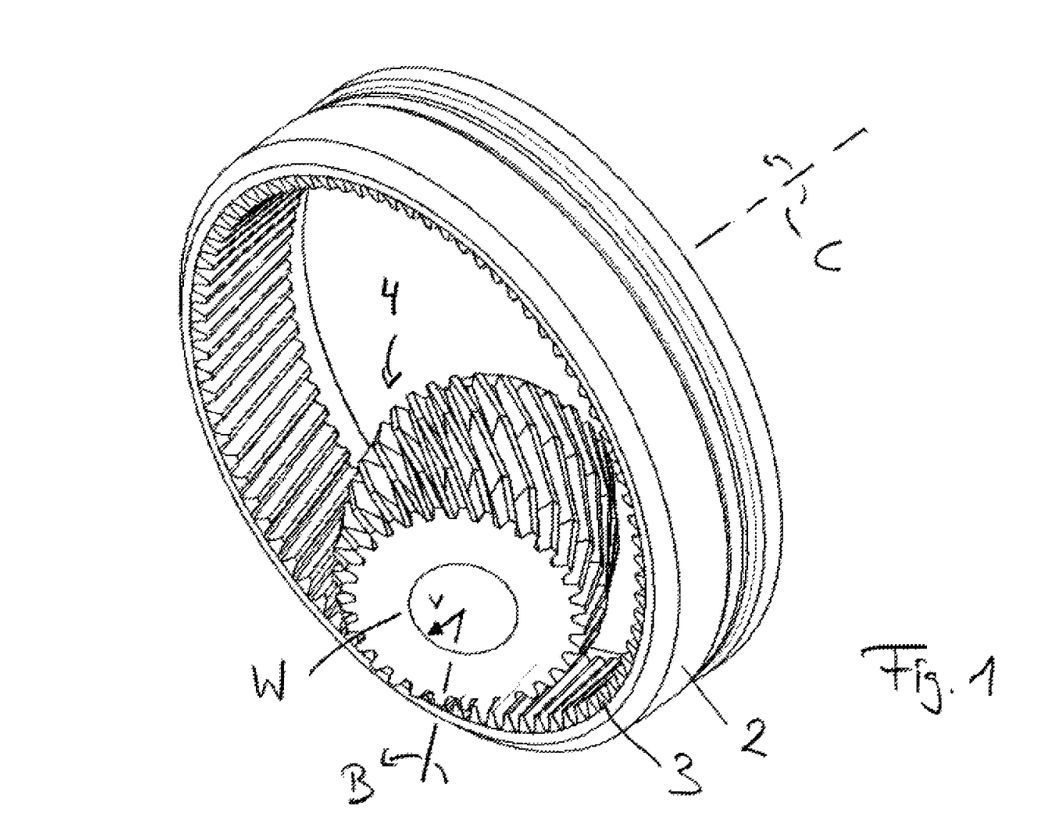
FIG. 1 is a perspective view of a tool and a workpiece.

FIG. 1 is a perspective view of an externally toothed tool W in engagement with an internally toothed workpiece 2. The internal teeth 3 of the workpiece 2 are subjected to abrasive hard-finishing by the teeth 4 of the tool W.

In the embodiment, the tool W is a cBN-coated helically toothed tool; however, other variants are conceivable, such as straight teeth and/or diamond-coated gears.

Figure 2:
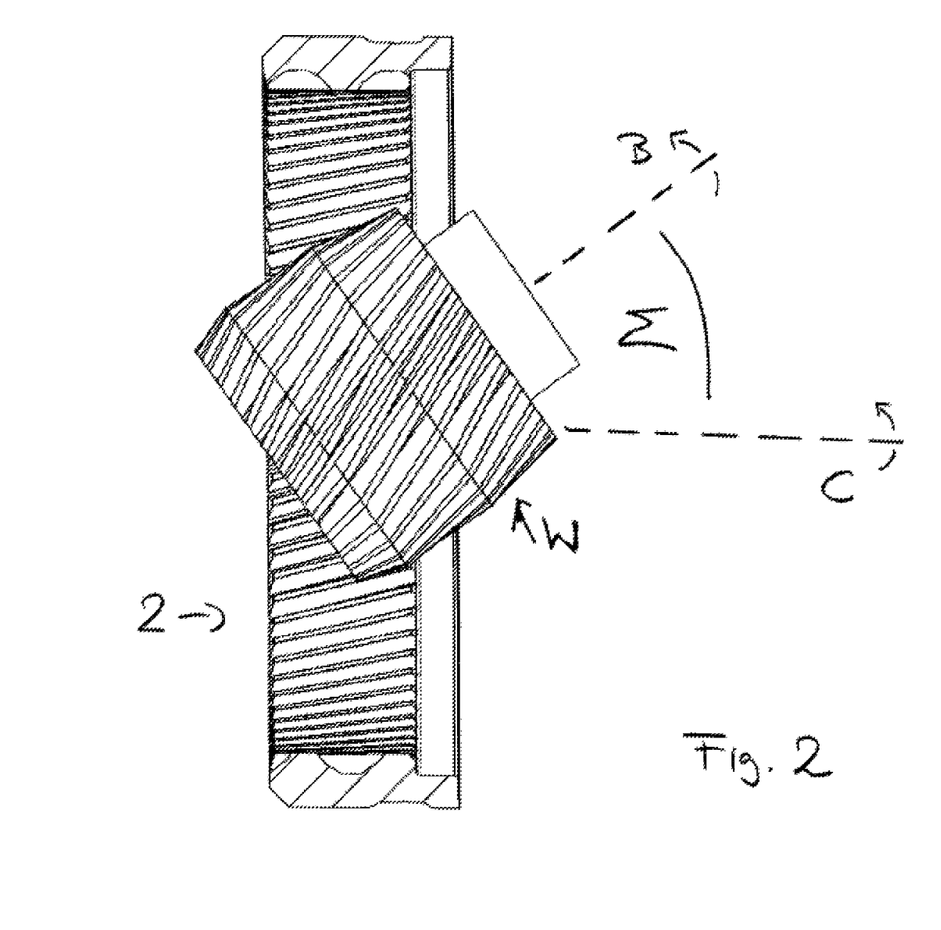
FIG. 2 shows the tool and workpiece in a view in which the plane of the paper is the normal plane of the common solder on the respective axes of rotation.

Moreover, it can be seen that the axes of rotation C of the tool 2 and B of the tool W are in a skewed position with respect to one another and together enclose an axis intersection angle Σ, as can be seen more clearly from FIG. 2. The machining is carried out in one or preferably more steps with a deeper radial infeed in each case and with a feed movement which, in this embodiment, runs in parallel with the rotation of axis C of the tool 2 and is represented by the arrow having the reference sign v in the illustration in FIG. 1.

Figure 3:
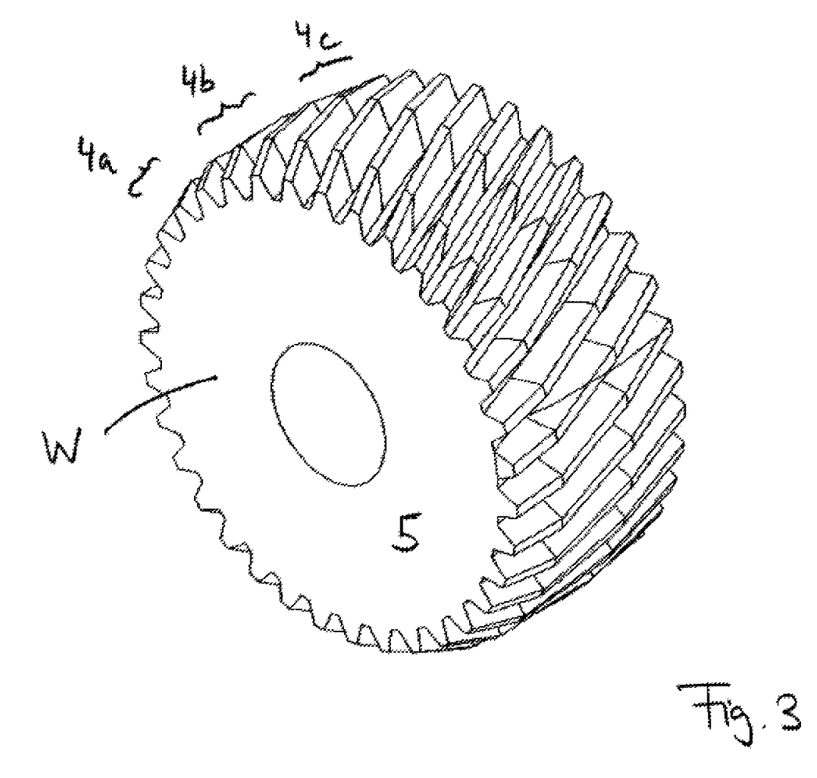
FIG. 3 is a perspective view of the tool alone.

As can be seen more clearly from FIG. 3, which shows only the tool W, the teeth 4 of the tool W are divided, as seen in the axial direction, into three regions $4a$, $4b$, $4c$ each having a different teeth design. In region $4a$, the tooth thickness of the teeth 4 increases from the end face 5 at the front with respect to the feed direction towards the other end face, so as to be constant in a central region $4b$ and to decrease again in the rear region $4c$. The tip circle diameter also has a similar profile in this respect, specifically increasing in region $4a$, remaining constant in region $4b$, and decreasing in region $4c$.

At this point, it should be noted that the deviations of the teeth in the regions $4a$, $4b$, $4c$ from a uniform shape are greatly exaggerated. In actual applications, these differences may be barely discernible to the naked eye.

Figure 4:
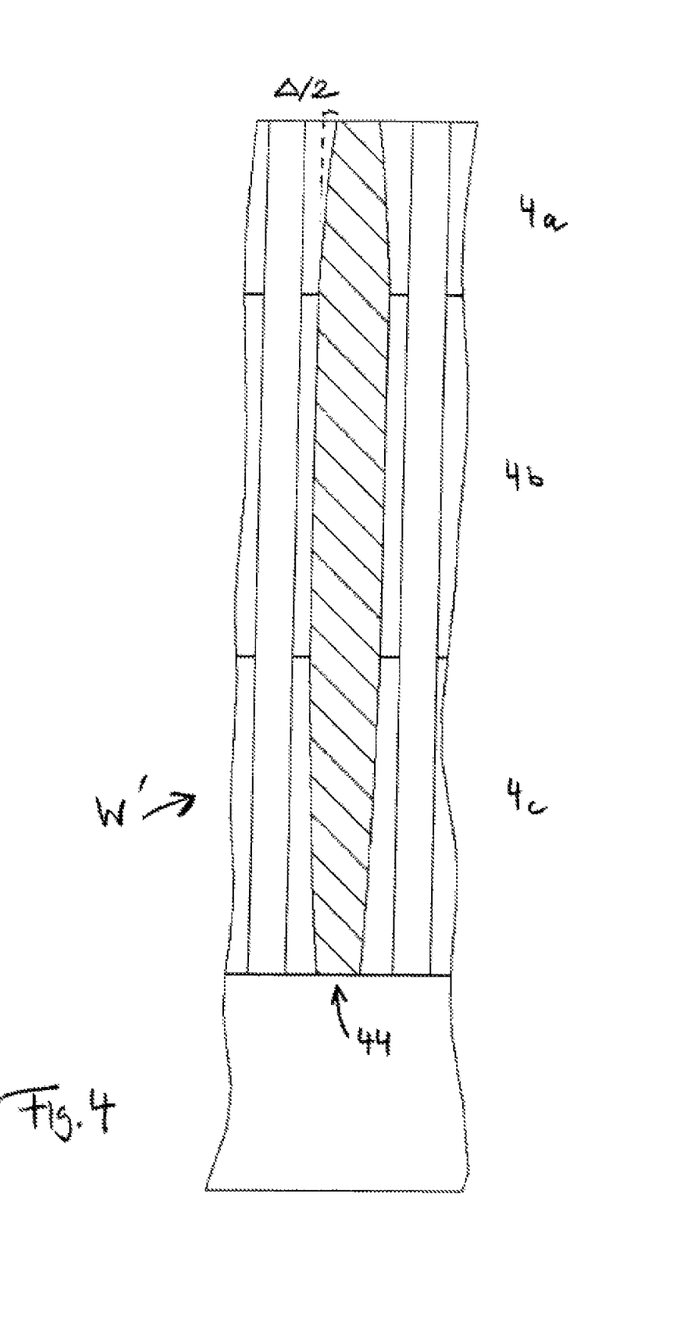
FIG. 4 shows a tooth thickness profile in the case of a straight-toothed tool.

FIG. 4 is a view in which the profile of the tooth thickness in the regions $4a$, $4b$, $4c$ can be seen even more clearly, for the sake of simpler illustration of a straight-toothed tool W'. The drawing shows a section through a tooth 44, in which the intersection is on the pitch circle. The half tooth thickness difference $\Delta/2$ is also shown in each case on the left and right flank between the region of smallest tooth thickness on the end face 5 to the transition between region $4a$ and region $4b$.

Moreover, FIG. 4 shows a preferred type of increasing tooth thickness, specifically in the form of a crown. However, the type could be conical or could have different crown profiles.

The removal mechanism is explained in the following with reference to the schematic drawing of FIG. 5. The region L on the left of the tool 2 represents the teeth 3 of the tool 2 having an allowance e.g. of the desired final shape of the teeth 3 (or before the nth hard-finishing stage, if the schematically shown operation of the tool W is the nth pass of the hard-finishing). On the side R on the right in FIG. 5, however, the allowance situation is shown on the workpiece 2 after the shown hard-finishing pass (or the final state to be achieved using hard-finishing, if the shown pass is the final machining pass).

It can be seen that the machining operation that changes the allowance is brought about substantially by region $4a$ of the workpiece W. However, the central region $4b$ primarily has a smoothing effect, and the machining contact is removed in region $4c$ (clearance section).

Figure 5:
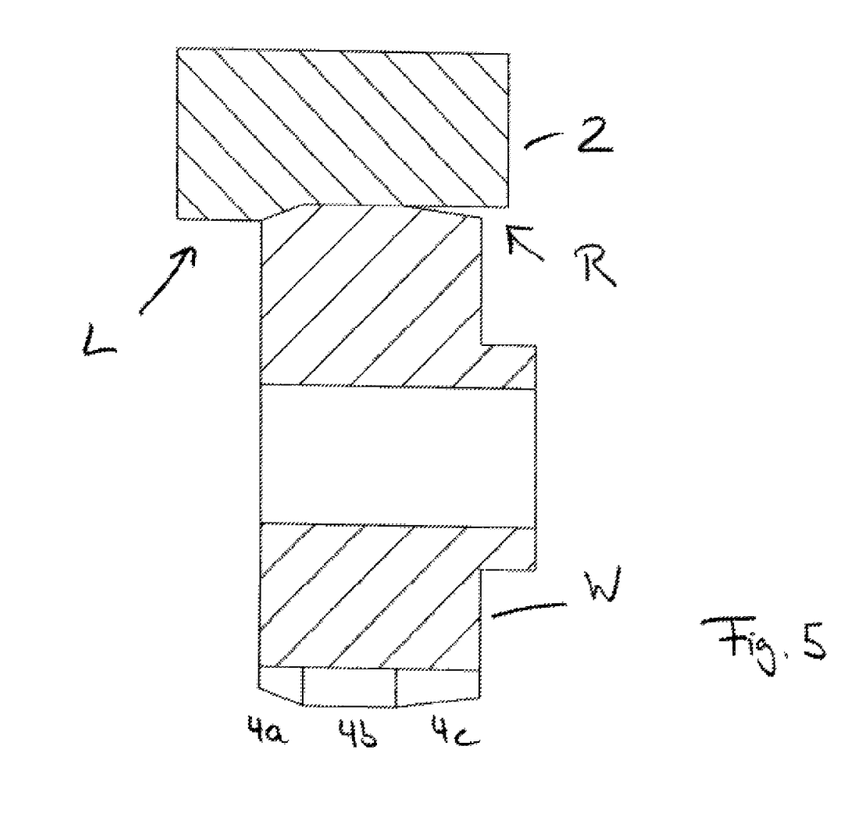
FIG. 5 is a simplified axial sectional view of the removal mechanism of the tool.

If, as shown in FIG. 5, the removal possibility of the region $4a$ acting as a rough cut portion and of increasing tooth width, which can be considered to be a ramp, is fully used, the half tooth thickness difference $\Delta/2$ corresponds to the removal that can be achieved in the selected machine axis setting (axis intersection angle Σ) (i.e. the allowance difference between before the relevant hard-finishing pass and thereafter). The removal performance does not need to be sustained by the tooth edge on the end face 5; rather, it is distributed over the length (viewed in the tooth width direction) of the ramp, i.e. of the region $4a$ of increasing tooth thickness.

Figure 6:
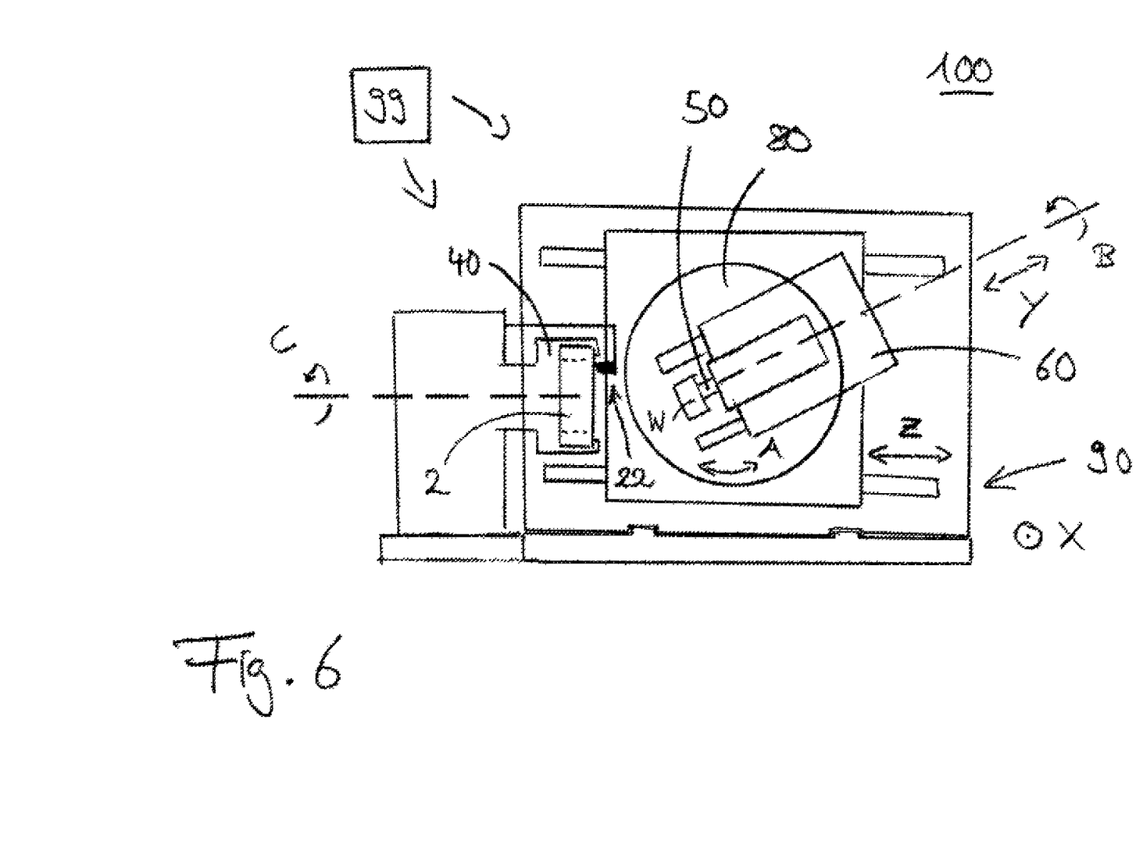
FIG. 6 is a schematic view of a gear cutter configuration.

FIG. 6 shows, on a schematic basis, a gear cutter 100 having the workpiece-side and tool-side machine axes, on which cutter the hard-finishing method can be carried out.

The internally toothed workpiece 2 is held on the workpiece side in a workpiece spindle 40 suitable therefor and can be rotatably driven about its axis of rotation C by means of a drive (not shown). The tool W is clamped on the tool side on a workpiece spindle 50. The tool spindle 50 is arranged on a tangential slide 60 of which the linear movement axis extends in parallel with the axis of rotation B of the tool and which is arranged on a rotary carrier 80. The rotary carrier 80 is in turn mounted on a cross-slide assembly 90. Said arrangement has movement axes Z, X, where the movement axis Z extends in parallel with the workpiece spindle axis C and can be used as a feed axis, whereas the movement axis X is perpendicular on the plane spanned by the axes of rotation C, B and serves as a radial feed axis. The axis intersection angle Σ can be adjusted by the machine axis of rotation A of the rotary carrier by rotation about the feed axis X.

It goes without saying that the machine 100 comprises a control means 99 which contains the control commands necessary for controlling the method in order to control the movement of the machine axes. This takes place in a CNC-controlled manner, preferably using direct drives for the machine axes, although indirect drives are also conceivable.

The reference sign 22 represents another pivotable centering sensor by means of which the angular position of the internal teeth 3 of the clamped workpiece 2 can be determined in a centering operation, in order to synchronize the axes of rotation B, C for the in-phase rolling machining operation between the tool W and the workpiece 2.

In particular in the case of workpieces having a shoulder, it is preferred for a radial return movement to be used in particular in the final and deepest passes, even if the workpiece teeth have not yet undergone an allowance reduction over the entire teeth width.

As a specific embodiment, an axis intersection angle of 9.5° and a feed rate of 0.03 mm per workpiece rotation could be used for inner teeth having 70 teeth and a module of 1.00 mm as hard-finishing parameters, for example, and the entire allowance could be removed in a total of four passes. However, this is merely an example, and other parameters may be used in accordance with the preferred ranges explained above.

The invention is therefore not limited to the above-mentioned embodiments. Rather, features of the above description and the following claims may be essential, individually and in combination, for implementing the invention in its different embodiments.

The invention claimed is:

1. A method for hard-finishing teeth of a machined toothed gearing having an axis of rotation (C) wherein a toothed hard-finishing tool (W) having tool teeth (4) and which rotates about an axis of rotation (B) is brought into rolling machining engagement with the machined toothed gearing in one pass or in a plurality of passes of different radial infeed depth by a feed movement using a directional component that is parallel to the axis of rotation (C) of the machined toothed gearing and at an axis intersection angle (Σ) that differs from zero, and material is removed from the teeth of the machined toothed gearing using an abrasive tooth flank region (4a) of the tool teeth (4) having a tooth thickness that increases in a tooth trace direction from an end face (5) of the hard-finishing tool nearer the machined teeth, along the axis of rotation of the toothed hard finishing tool.

2. Method according to claim 1, wherein the tooth flank region (4a) of increasing tooth thickness comprises a portion of increasing tooth height.

3. Method according to claim 1 wherein the infeed depth is changed between two passes to such an extent that half a tooth thickness difference (Δ/2) of the tooth flank region removing material from the teeth of the machined toothed gearing is exceeded by no more than 10% and/or is no smaller than 30% of the tooth thickness difference.

4. Method according to claim 1 wherein the tooth flank region of increasing tooth thickness in the tooth trace direction comprises (a) a length extending between the end face and an inner end the tooth flank region of increasing tooth thickness, and (b) a tooth thickness difference between the tooth thickness at the end face and the tooth thickness at the inner end, wherein a ratio of the tooth thickness and the length is at least 1/200.

5. Method according to claim 1 wherein the tooth flank region of increasing tooth thickness in the tooth trace direction comprises a length extending between the end face and an inner end the tooth flank region of increasing tooth thickness, wherein the length is at least 1×m, with m being a module of the tool teeth (4).

6. Method according to claim 1 wherein a tooth flank region (4b) of constant or decreasing tooth thickness adjoins the tooth flank region of increasing tooth thickness in the tooth trace direction.

7. Method according to claim 1 wherein a region (4c) of decreasing tooth thickness is formed in the feed movement direction behind the region of increasing tooth thickness in the tooth trace direction.

8. Method according to claim 1 wherein the plurality of passes comprise a reduced infeed depth change and/or feed rate in a last pass with respect to a penultimate pass.

9. Method according to claim 1 with a module m, measured in mm, of the tool teeth of at least 0.4 and/or at most 8.

10. Method according to claim 1 wherein the axis intersection angle is at least 1° and/or is at most 45°.

11. Method according to claim 1 wherein the tool rotates at a speed of at least 40 and/or at most 7000 rpm.

12. Method according to claim 1 wherein a feed rate in mm per workpiece rotation in at least one pass is at most 0.2 and/or at least 0.01.

13. Method according to claim 1 wherein the tool teeth include a surface comprising an abrasive, the abrasive surface at least in a portion of the tooth flank region of the tool teeth (4) having a tooth thickness that increases in the tooth trace direction near the end face nearer the machined teeth comprises a coarser grain of abrasive than a portion of the tool teeth located behind the tooth flank region of increasing tooth thickness in the tool trace direction.

14. A machine tool for hard-finishing teeth of a machined toothed gearing, said machine tool comprising a rotatable clamping means for rotating a workpiece having machined toothed gearing to be hard-finished about a workpiece axis, a rotationally driven clamping means for rotating a hard-finishing tool (W) having teeth about a tool axis, said machine having movement axes for implementing a radial feed movement (X) between the workpiece and the tool, for the relative movement (Z) between the workpiece and the tool which implements the feed movement using the directional component that is in parallel with the axis of rotation of the machined toothed gearing workpiece, and an axis of rotation (A) for setting an axis intersection angle, which differs from zero, between the tool axis and the workpiece axis, and a control means which contains control instructions that control the machine in order to carry out a method according to claim 1.

15. Method of claim 1 wherein the teeth of the machined toothed gearing comprise internal teeth.

16. Method of claim 7 wherein the region (4c) of decreasing tooth thickness is formed in the feed movement direction adjacent an end face remote from the end face (5) of the hard-finishing tool nearer the machined teeth.

* * * * *